United States Patent
Matossian et al.

Patent Number: 5,143,747
Date of Patent: Sep. 1, 1992

[54] DIE IMPROVED TOOLING FOR METAL WORKING

[75] Inventors: Jesse N. Matossian, Woodland Hills; Joseph A. Wysocki, Oxnard; Robert G. Wilson, Canoga Park; Frederick G. Yamagishi, Newbury Park, all of Calif.; Edward F. Ryntz, Jr., Warren, Mich.

[73] Assignees: Hughes Aircraft Co., Los Angeles, Calif.; General Motors Corporation, Detroit, Mich.

[21] Appl. No.: 654,868

[22] Filed: Feb. 12, 1991

[51] Int. Cl.$^5$ ............................................. B05D 3/06
[52] U.S. Cl. ...................................... 427/38; 427/39; 428/688
[58] Field of Search .......................... 427/38, 39, 249; 428/688

[56] References Cited

U.S. PATENT DOCUMENTS

| | | | |
|---|---|---|---|
| 3,900,630 | 8/1975 | Makishima et al. | 427/257 X |
| 4,623,400 | 11/1986 | Japka et al. | 427/249 X |
| 4,764,394 | 8/1988 | Conrad | 427/38 |

OTHER PUBLICATIONS

S. Ohira et al., "Characterization of the Aluminium Surface Layer Implanted with Nitrogen", Mat. Sci. and Eng., vol. 90, pp. 143-148 (1987).
Y. Wang et al., "The modification of the mechanical properties of soft metals by ion implantation", Vacuum, vol. 39, pp. 293-295 (1989).
I. Takano et al., "Effect of $N_2^+$ Ion Dose on the Hardness and Other Properties of Aln Thin Films Prepared by the Dynamic Mixing Method", Nuc. Inst. and Methods in Phys Res, vol. B37/38, pp. 688-691 (1989).
S. Lucas et al., "Temperature and Dose Dependencies of Nitrogen Implantation into Aluminum", Nuc. Inst. and Methods in Phys. Res., vol. B50, pp. 401-405 (1990).
P. B. Madakson, "Surface stresses and the hardness of ion implanted aluminum", J. Phys. D: Appl. Phys. vol. 18, pp. 531-540 (1985).
T, Venkatesan, "High Energy Ion Beam Modification of Polymer Films", Nuc. Inst. and Methods in Physics Research, vol. B7/8, pp. 461-467 (1985).

*Primary Examiner*—Michael Lusignan
*Attorney, Agent, or Firm*—V. D. Duraiswamy; W. K. Denson-Low

[57] ABSTRACT

The resistance to wear-induced failures during forming operations of non-ferrous die tooling materials, such as epoxy-based and zinc-based materials, is improved by treating the surface of the die tooling. In one approach, the surface of an organic-containing or metallic substrate is coated with a silicon-modified organic materials and then implanted with ions of an inert gas to transform the organic material to a silicon carbide-rich layer. In the other, nitrogen ions are implanted into the surface of a zinc-based alloy.

19 Claims, 1 Drawing Sheet

DIE IMPROVED TOOLING FOR METAL WORKING

BACKGROUND OF THE INVENTION

This invention relates to metal working operations, and, more particularly, to die tooling with improved resistance to wear.

Many metallic articles are formed to their final shapes and sizes by metal working techniques. In one such technique, a thin metal article is formed from a sheet or coiled strip metal workpiece using a metal forming die. The die is another piece of material having a preselected shape that aids in the forming of the workpiece into its intermediate or final shape. Sheet workpieces are commonly formed by forcing the sheet into a female die using a male die.

Some of the die forming operations involve large tonnages of metal workpieces and produce familiar products. For example, most automobiles have metallic body panels. To fabricate those panels, flat pieces of metal sheet are formed by placing the starting sheet over a female die, and then forcing the sheet into the female die with an appropriately shaped male die. The resulting part has the complex shape of the body panel.

The life of dies is normally limited by wear that causes changes in their dimensions and thence to the dimensions of the finished parts. As each part is formed, the friction between the sheet workpiece and the die removes some small amount of material from the die. Eventually, the die is so changed in dimension that the final products do not meet the dimensional standards.

In production operations, the dies are made from specialty steels or other ferrous-alloy materials that are very hard and wear resistant compared with the articles produced using these dies. Such dies can be used to form thousands of individual parts. These dies used in production operations are typically expensive to manufacture for a number of reasons, including the difficulty in machining hard materials and the need to perform extensive surface treatments.

There is an economic incentive in the manufacturing industry to replace expensive ferrous-alloy tool and die materials with less expensive non-ferrous materials. These non-ferrous materials can be zinc-based or aluminum-based metals or even non-metallic materials such as plastic or epoxy. The problem, however, is that all of these non-ferrous materials exhibit reduced wear life compared to ferrous materials. The use of non-ferrous materials has therefore been limited to prototype fabrication or limited production runs where it is not necessary that the die perform to produce thousands of parts. For the non-ferrous die materials to have production applications, techniques must be developed to extend their wear life.

There is therefore a continuing need for improved non-ferrous die materials, which are inexpensive and have acceptable wear-life characteristics. The present invention fulfills this need, and further provides related advantages.

SUMMARY OF THE INVENTION

The present invention provides improved non-ferrous die materials and dies for use in metal working operations. The die materials and dies of the invention are less subject to wear than are prior non-ferrous die materials and dies, and therefore have longer lives in the sense that more parts can be produced before replacement of the dies is required.

In accordance with the invention, a process for working a workpiece using a tool having a preselected shape comprises the steps of furnishing a substrate having the preselected shape of a material-working tool; coating the substrate with a coating of a silicon-modified organic material; and implanting the coating with a sufficient number and energy of inert gas atoms to transform the silicon-modified organic material at least in part to a silicon carbide-containing coating.

In this process, the substrate is formed to the desired die shape and dimensions by a conventional technique such as machining. The substrate is preferably a known type of non-ferrous die material such as a filled epoxy or a zinc-based metallic alloy. The surfaces of the die most subject to wear are coated with a silicon-modified organic material such as an organic silane, which also contains hydrogen and carbon. The coating is preferably thin, on the order of 200 nanometers thick (or, alternatively stated, 2000 Angstroms). Because the coating is so thin, the original substrate can be machined to essentially the same dimensions as in conventional practice wherein no coating is used, an important convenience for the die makers. After the coating is applied, it is implanted (bombarded) with inert gas atoms, preferably provided as ions, of sufficient energy and of a sufficient total dose to alter the organic material to remove hydrogen. The use of ion implantation to transform the applied coating into a coating having different properties than the original coating is known as ion-beam mixing, ion beam enhanced deposition (IBED), or ion beam assisted deposition (IBAD). Examples of acceptable ion implantation techniques to transform the coating are direct implantation, such as described in U.S. Pat. No. 3,900,630, or plasma source ion implantation, such as described in U.S. Pat. No. 4,764,394. This implantation treatment transforms the coating to a silicon carbide-containing layer, which normally has some hydrogen remaining therein. The silicon carbide-containing layer improves the wear resistance of the die, thereby increasing its life during service.

In another approach within the scope of the invention, a process for working a workpiece using a tool having a preselected shape comprises the steps of furnishing a substrate formed of a zinc-based alloy and having the preselected shape of a material working tool; and implanting nitrogen, preferably in the form of nitrogen ions, into the surface of the substrate to harden the surface of the substrate.

This technique, applicable to zinc-based alloys containing copper and aluminum as alloying ingredients, is practiced by preparing a substrate to the desired die shape and dimensions. No coating is required. Nitrogen ions are implanted into the surface to modify the surface of the die so that it is more wear resistant and has a longer life than an untreated die.

The approach of the invention has the important advantage that the surfaces of the dies are treated to obtain improved performance after final machining, and without the need to raise the temperature of the machined die significantly. Other surface treatments to improve die performance typically require that the die be heated to at least several hundred degrees during the surface treatment process, and then cooled to ambient temperature. Such temperature changes during surface treatment can cause the die to warp from its desired shape due to stresses in the die and to uneven heating and cooling. If the die material itself contains an organic component, as in the case of a filled polymer such as an epoxy, surface treatments may simply not be possible because the organic component cannot tolerate the temperature required for the surface treatment. Another important advantage of the approach of the invention is that it introduces little or no significant dimensional changes into the implanted article.

Thus, the present invention provides an advance in the art of metal working dies. Other features and advantages of the invention will be apparent from the following more detailed description of the preferred embodiments, taken in conjunction with the accompanying drawings, which illustrate, by way of example, the principles of the invention.

DETAILED DESCRIPTION OF THE INVENTION

Figure 1:
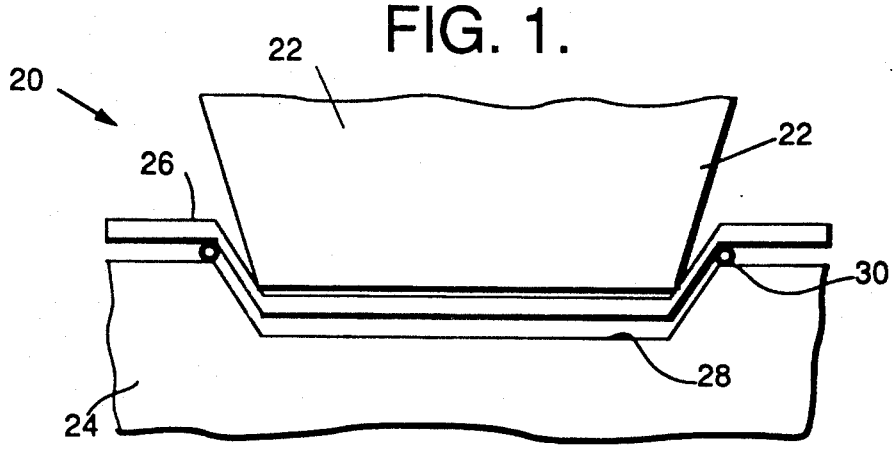
FIG. 1 is a schematic side elevational view of a male/female set of metalworking dies during a forming operation.

By way of background, FIG. 1 illustrates a die set 20 having a male die 22 and a female die 24, at an intermediate stage of the fabrication of a thin sheet workpiece 26. The female die 24 has a die surface 28 of the preselected final desired shape of the workpiece 26. The male die 22 has a corresponding preselected shape to force the workpiece 26 into the female die 24 until the workpiece 26 reaches that final desired shape as defined by the dies.

Frictional wear occurs on all faces of the dies 22 and 24 that contact the workpiece 26. Lubricants are typically applied to these faces to reduce friction and thence wear, but wear still occurs. After a number of forming operations with a succession of workpieces, the wear-induced dimensional changes of the tool may become so large that the finished part is no longer within its required tolerances. The dies are then refurbished or scrapped, either operation being expensive.

As may be seen by inspection of FIG. 1 and as known from die forming experience, the greatest incidence of wear-induced damage typically occurs at a die bead 30 wherein the workpiece enters the female die 24. The combination of bending and frictional forces produce the most severe damage at the die bead 30. The present invention is therefore most beneficially utilized in conjunction with protection of the die bead 30, although it is applicable to other regions of the dies 22 and 24.

Figure 2:
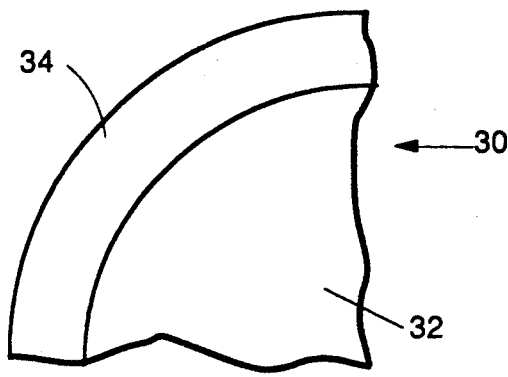
FIG. 2 is a greatly enlarged side elevational view of a portion of a die bead with a coating of a silicon-modified organic material.
Figure 3:
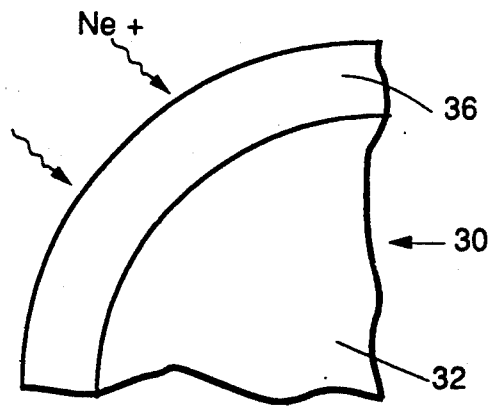
FIG. 3 is a side elevational view similar to FIG. 3, after completion of the ion-implantation treatment.
Figure 4:
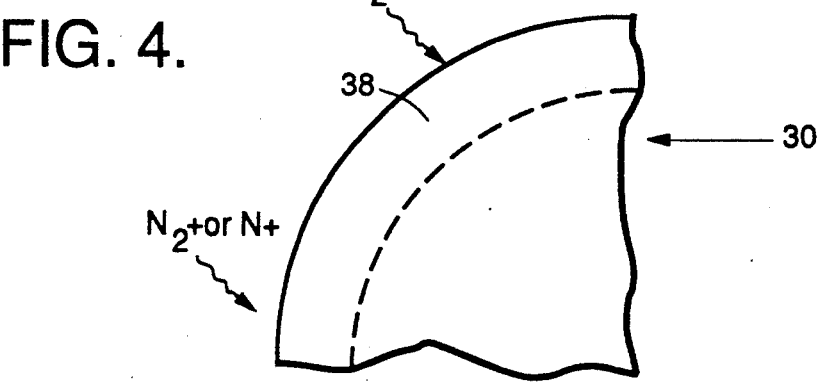
FIG. 4 is a greatly enlarged side elevational view of a die bead after nitrogen implantation.

FIGS. 2–4 illustrate the curved die bead 30 in greatly enlarged form as a preferred portion of the die set 20 to receive the processing of the invention. As the initial step of the present approach, the die bead 30 and the remaining portions of the dies 22 and 24 are furnished in their final preselected shape and size for the forming operation. The ability to place the dies into their final form at the outset of the process is important for two reasons. First, it permits the present invention to be used in conjunction with established die structures. Second, no expensive post-treatment machining operations are required. By contrast, one of the reasons that other die treatments are so expensive is that they require initial care to produce a die for surface treatment and then precision final machining of the die after the treatment is complete. The die shape and size must often be specially selected for the treatment process, and then the treated die is machined to the final desired shape after the surface treatment. The present approach requires no such final machining, and indeed such final machining of the die surfaces is not permitted because it would disrupt the thin treated layer.

The bead 30 includes a substrate 32 formed of a die material. The substrate may be a metal such as a zinc-based alloy containing copper and aluminum, or a non-metal such as a filled epoxy polymer. The substrate 32 is coated with a coating 34 of a silicon-modified organic material, as shown in FIG. 2. The coating 34 is preferably applied by dipping the substrate 32 into a solution of the silicon-modified organic material dissolved in an appropriate solvent such as toluene, resulting in a coating thickness of from about 100 to about 250 nanometers, most preferably about 200 nanometers. After the ion implantation treatment, a coating of this thickness provides improved die life. This coating is so thin that it is not necessary to make an allowance for it in machining the dies to their final preselected shape prior to coating. That is, if the coating were much thicker, on the order of thousandths of an inch, it might be necessary to make allowance for the coating thickness when the dies were machined, so that they could not be machined to their preselected final shapes and sizes. Conventional machining techniques are not accurate to dimensions within the range of a few hundred nanometers, and therefore the dies can be machined to their final preselected shape and size without regard to the fact that they will subsequently be coated.

The coating material is a silicon-modified organic material such as an organic silane. (Under some very strict definitions, an "organic" material can contain only carbon, oxygen, and hydrogen. In a less restrictive usage that is adopted herein, the "organic" material contains these elements and others, and in particular is modified by the addition of silicon bonded to the basic molecule.) A preferred silicon-modified organic material is poly (dimethylsilane-co-methylphenylsilane), which contains carbon, silicon, and hydrogen in an atomic ratio C:Si:H of 9:2:14. In a preferred application approach, this coating material is dissolved in a solvent such as toluene and the solution filtered. The die material, such as the bead 30, is dipped into the filtered solution and dried.

The coated bead is implanted with energetic inert gas atoms, preferably in the form of ions (which are atoms that have been ionized) of a sufficient energy and total dose to transform the coating into a predominantly silicon carbide-containing layer 36, illustrated in FIG. 3. The preferred inert gas is neon, as an atom or an ion $Ne^+$, although other inert gases such as argon can also be used. The inert gas may be provided as an ion by using an ion implantation apparatus of any conventional mode of operation and type. For example, the ion implantation can be by direct implantation, such as described in U.S. Pat. No. 3,900,630, or plasma source ion implantation, such as described in U.S. Pat. No. 4,764,394, whose disclosures are incorporated by reference. Any acceptable energy may be used, with energies in the 50–300 thousand electron volt (KeV) range preferred. A presently preferred energy is 270 KeV.

The total dose may vary, but is typically in the range of about $10^{14}$–$10^{17}$ ions per square centimeter. A presently most preferred dose is about $4\times 10^{14}$ ions per square centimeter for a 200 nanometer thick coating 34.

The mechanism of surface improvement is not known with certainty, and the inventors do not wish to be bound by the following possible explanation. It is presently believed that the ion implantation transforms the organic material toward a silicon-to-carbon atom ratio of 1:1, and reduces the content of hydrogen, nitrogen, oxygen, and other elements that might be present in the initial coating 34. Such transformations are known, and are described, for example, in the publication of T. Venkatesan, "High Energy Ion Beam Modification of Polymer Films", *Nucl. Instr. and Methods in Phys. Res.*, Vol. B7/8, pages 461-467 (1985). However, it has not been previously known to utilize the technique in conjunction with the preparation of die tooling.

After the die or die part has been implanted with ions as described, it is assembled into the die set 20. A workpiece is then die formed using the approach described previously. No post-implantation machining of the wear surface of the die bead is performed, nor could any such machining be performed because of the possibility of removing the thin treated layer. Nevertheless, the die bead retains its required dimensions from the machining prior to implantation to be effective for forming operations.

One of the useful non-ferrous die materials is a zinc-based alloy containing copper and aluminum. A preferred composition, in weight percent, is 0-10 percent aluminum, 0-20 percent copper, balance zinc, but containing at least some aluminum or copper. This die material may be treated by the approach just described, or by an approach wherein no coating is used and the implanted ion is nitrogen rather than an inert gas ion.

FIG. 4 illustrates a die bead 30 formed of the zinc-based alloy. Under the second approach, nitrogen atoms in the form of ions are implanted into the surface of the die part, to form an implanted region 38. The implanted region 38 is not a separate layer that is applied to the surface, but is instead a treated portion of the part that has been previously machined to its preselected shape. The preferred energy of the ions during implantation is from about 50 to about 150 KeV, with 135 KeV presently most preferred. The preferred total dose is from about $10^{16}$ to about $10^{18}$ ions per square centimeter, with a dose of about $10^{18}$ ions per square centimeter presently most preferred. The die part is then used in a metal working operation such as that depicted in FIG. 1. No post-implantation machining of the wear surface of the die bead is performed, nor could any such machining be performed because of the possibility of removing the thin treated layer. Nevertheless, the die bead retains its required dimensions from the machining prior to implantation to be effective for forming operations.

The mechanism of die surface improvement for the nitrogen-implanted zinc-based alloy is not known with certainty. It may be a chemical reaction to form a nitride, straining of the surface layers by the implanted ions, or a combination of the two. Some chemical reaction is likely, as the benefits of the process are specific to the use of nitrogen ion implantation.

The following examples are intended to illustrate aspects of the invention, and should not be taken as limiting of the invention in any respect.

EXAMPLE 1

An epoxy block was machined to a preselected die bead shape and size required for the forming of a workpiece into a part, and was not formed either oversize or undersize to account for a surface treatment coating.

A coating mixture was prepared by mixing five parts by weight of poly (dimethylsilane-co-methylphenylsilane) and 400 parts by volume toluene. The mixture was stirred overnight and then filtered through a series of filters from 25 micrometers down to 0.1 micrometer pore size. The filter bead was dip coated with a single dipping in the solution, dried at room temperature, and then dried at about 50° C. in vacuum. The thickness of the dried layer was estimated to be about 200 nanometers by Nano-Spec measurements. The coated die bead was ion implanted with neon ions at an energy of 270 KeV and a total dose of about $4\times 10^{14}$ ions per square centimeter. The coating remained adherent to the substrate.

EXAMPLE 2

Example 1 was repeated, except that the total dose of neon ions was about $10^{16}$ per square centimeter. The coating remained adherent to the substrate.

EXAMPLE 3

The treated die bead of Example 1 was subjected to a standard harsh draw test wherein a piece of sheet metal is drawn across the surface. The drawing test was repeated six times before there was an indication of the onset of wear on the surface of the treated draw bead. For comparison, an identical but untreated draw bead was tested in the same test. It showed significant wear after only one draw procedure.

The draw tests for the treated and untreated die beads were continued for a total of nine draws, and the surfaces were inspected. The treated draw bead had a much smoother surface at the completion of nine draws than did the untreated draw bead.

EXAMPLE 4

The process of Example 1 was repeated, except that the die bead substrate was replaced with a block formed of a metallic zinc-based material having a composition, in weight percent, of 0-10 percent aluminum, 0-20 percent copper, balance zinc. The total dose of neon ions was about $10^{15}$ per square centimeter. The coating remained adherent to the block.

EXAMPLE 5

The process of Example 4 was repeated on two other specimens, except that the total dose of neon ions was $10^{16}$ per square centimeter in one case and $10^{17}$ per square centimeter in the other case.

EXAMPLE 6

The block specimens of Examples 4 and 5 having neon doses of $10^{15}$, $10^{16}$, and $10^{17}$ ions per square centimeter were tested for wear resitance using an enhanced Falex block-on-ring wear test and a testing pressure of 4000 pounds per square inch. An untreated specimen was used as a basis for comparison. The specimen having a dose of $10^{15}$ ions per square centimeter had a reduction in wear rate of 1.4 times, and the specimen having a dose of $10^{16}$ had a reduction in wear rate of 1.2 times, as compared with the untreated specimen tested in an identical manner. The specimen having a dose of $10^{17}$ ions per square centimeter had the same wear rate as the untreated specimen.

EXAMPLE 7

A block was prepared from the zinc-based alloy having a composition in weight percent of 0–10 percent aluminum, 0–20 percent copper, balance zinc. Atomic nitrogen ions were implanted into the block at ambient temperature with an energy of 135 KeV and a dose of $10^{18}$ ions per square centimeter. An identical block was left untreated.

EXAMPLE 8

The blocks of Example 7 were tested in the block-on-ring wear test apparatus discussed under Example 6. The untreated block was tested at a loading of 4000 pounds per square inch. The treated block tested at this same pressure exhibited a completely unexpected wear rate reduction of 74 times as compared with the untreated block. The same treated block was then tested at a loading of 12,000 pounds per square inch, and even at three times the loading exhibited a wear rate reduction of 1.5 times compared to the untreated block.

The approach of the invention provides an approach for improving the wear performance of die tooling with minimal cost. Although particular embodiments of the invention have been described in detail for purposes of illustration, various modifications may be made without departing from the spirit and scope of the invention. Accordingly, the invention is not to be limited except as by the appended claims.

What is claimed is:

1. A process for working a workpiece using a tool having a preselected shape, comprising the steps of:
   furnishing a substrate having the preselected shape of a material-working tool;
   coating the substrate with a coating of a silicon-modified organic material; and
   implanting the coating with a sufficient number and energy of inert gas atoms to transform the silicon-modified organic material at least in part to a silicon carbide-containing coating.

2. The process of claim 1, wherein the substrate comprises an organic material.

3. The process of claim 1, wherein the substrate comprises an epoxy.

4. The process of claim 1, wherein the substrate comprises a non-ferrous metallic alloy.

5. The process of claim 1, wherein the substrate comprises a zinc-based alloy.

6. The process of claim 1, wherein the substrate consists essentially of, in weight percent, about 0–10 percent aluminum, about 0–20 percent copper, balance zinc.

7. The process of claim 1, wherein the silicon-modified organic material is an organic silane.

8. The process of claim 1, wherein the silicon-modified organic material is poly (dimethylsilane-co-methylphenylsilane).

9. The process of claim 1, wherein the thickness of the coating is from about 100 to about 250 nanometers.

10. The process of claim 1, wherein the inert gas atoms are ionized.

11. The process of claim 10, wherein the ion dose during the step of implanting is about $10^{14}$ ions per square centimeter.

12. The process of claim 10, wherein the energy of the ions in the step of implanting is from about 50–300 thousand electron volts.

13. The process of claim 10, wherein the inert gas ions are neon ions.

14. The process of claim 1, including the additional step, after the step of implanting, of
   working a workpiece using the coated and implanted substrate.

15. The process of claim 1, wherein the step of implanting is accomplished by implanting ionized atoms into the coating.

16. A process for working a workpiece using a tool of a preselected shape, comprising the steps of:
   furnishing a substrate formed of a zinc-based alloy and having the preselected shape of a material working tool; and
   implanting nitrogen into the surface of the substrate to harden the surface of the substrate.

17. The process of claim 16, wherein the substrate has a composition consisting essentially of, in weight percent, about 0–10 percent aluminum, about 0–20 percent copper, balance zinc.

18. The process of claim 16, wherein the dose of nitrogen introduced in the step of implanting is from about $10^{17}$ to about $10^{18}$ ions per square centimeter.

19. The process of claim 16, wherein the step of implanting is performed by ion implantation.

* * * * *